Patented July 3, 1951

2,559,104

UNITED STATES PATENT OFFICE 2,559,104

FLOTATION RECOVERY OF MOLYBDENITE

Nathaniel Arbiter and Orel E. Young, Morenci, Ariz., assignors to Phelps Dodge Corporation, New York, N. Y., a corporation of New York No Drawing. Application March 23, 1948, Serial No. 16,635

6 Claims. (Cl. 209—166)

This invention relates to the separation of molybdenite from flotation concentrates containing small amounts of molybdenite and larger arounts of the sulfides of other metals.

The major source of the metal molybdenum is the mineral molybdenite ($MoS_2$) which occurs frequently as a minor constituent of ores containing copper, iron and other sulfides. Such ores are usually treated by flotation to concentrate the mineral content, and various methods have been proposed for separating the molybdenite from the other metal sulfides in these concentrates.

The other methods heretofore known, however, have involved procedures which are not entirely satisfactory for one reason or another. For example, some procedures involve steaming or roasting of the flotation concentrate, which is a difficult and unduly expensive operation unless the amount of molybdenite to be recovered is quite substantial. Other methods involve depressing the molybdenite into the tailing, but in general these methods do not produce an efficient recovery of this mineral.

One object of our invention is to provide a process of recovering molybdenite from mixed sulfide flotation concentrates by a simple economical procedure that does not require steaming, roasting or the use of large amounts of fresh water for repulping the concentrate.

A further object of our invention is to condition a mixed sulfide flotation concentrate by treatment with an oxidizing agent and to recover molybdenite from the conditioned material by selective flotation.

Other objects and advantages of the invention will be explained or will be apparent from the following description.

It is recognized that mixed sulfide flotation concentrates are not readily susceptible to selective flotation treatment for separation of one sulfide mineral from another without some subsidiary treatment. In the production of the mixed sulfide concentrate by flotation, the collector and frother added to the original ore pulp tend to accumulate in the concentrate, and their adverse effect must be prevented in some way before a controlled selective flotation treatment can be applied successfully to the concentrate. Steaming or roasting of the concentrate is helpful in preventing this adverse effect, but involves necessarily the use of large quantities of heat expensively applied and therefore is not economical if the amounts of molybdenite to be recovered are relatively small. These reagents can be eliminated to some extent by repulping the entire concentrate with fresh water, but such a procedure obviously is not feasible in many localities where the ores and concentrates have to be treated, and where fresh water is at a premium.

We have found that a more economical but still efficient method of preventing the adverse effect of the collector and frother in such a mixed sulfide concentrate is to condition the mixed sulfide concentrate with an oxidizing agent. In many cases it is desirable to use along with the oxidizing agent an activated carbon, or a similar material, to reduce the active excess frother, so that in subsequent selective flotation treatment froth can be maintained appropriate for the flotation of the molybdenite when the sulfides of other metals such as copper and iron are being depressed. In general, best results are obtained if the oxidizing agent is added and allowed to condition the concentrate before the selective flotation treatment actually commences.

The particular oxidizing agent used may be any material which acts as an oxidizing agent for the collector under the conditions of application or treatment. For example, certain compounds may require an alkaline or neutral medium in order to be most effective as an oxidizing agent, while other compounds are more effective in an acid medium. For example, hypochlorites and peroxides are very effective in an alkaline medium such as is usually maintained in the treatment of pulps of many copper ores or concentrates. In this connection, the hypochlorites are also economical to use and appear to have a strong and relatively permanent depressing action on the copper and iron sulfides, permitting good separation and recovery of the molybdenite in the froth. Permanganates are also effective in an alkaline medium, but in general such oxidizing agents as dichromates and permanganates are more effective when used in an acid medium. It is also possible to condition an alkaline concentrate by adding to it an oxidizing agent such as potassium dichromate, together with sulfuric acid, and after a suitable conditioning time, such as 5 to 10 minutes, neutralizing the material with soda ash or the like to restore it to the alkaline condition.

It should be kept in mind that in all of these treatments where excess frother is present, it may be desirable, along with the other reagents, to add a sufficient quantity of activated carbon to reduce the frother content.

We have found, for example, that sodium hypochlorite and activated carbon produce good results in the treatment of an alkaline concentrate containing large amounts of copper and iron sulfides with less than 1% molybdenite.

The sodium hypochlorite may be used in the form of a commercial household bleach, or may readily be produced by interaction of chlorine gas and caustic soda. Other hypochlorites, such as calcium hypochlorite, may likewise be used. The amounts of the reagents required will vary, of course, depending upon various factors, such as the amount of collector in the concentrate, the strength of the oxidizing agent and the conditions under which it is used. In general, 1 to 10 pounds of oxidizing agent per ton of concentrate treated is satisfactory, although the particular amount employed is not critical and will depend to some extent on the particular oxidizing agent selected. The amount of activated carbon needed, if any, will depend upon the amount of frother to be adsorbed, and, in general, one-half to two pounds of activated carbon per ton of concentrate is sufficient for this purpose.

In order that the invention may be more readily understood, the following examples are given:

1. A flotation test was carried out in a Fagergren flotation cell using as feed a sample of copper concentrate assaying 0.21 percent $MoS_2$ and much larger amounts of copper and iron sulfides. The reagents were added in the order and amounts indicated below, the rougher molybdenite concentrate was removed for six minutes and this rougher concentrate was then cleaned for a period of five minutes.

| Product | $MoS_2$ | | Cu | |
|---|---|---|---|---|
| | Assay | Distribution | Assay | Distribution |
| | Per cent | Per cent | Per cent | Per cent |
| Cleaner Con | 29.40 | 70.8 | 14.84 | 0.3 |
| Cleaner Tail | 1.65 | 20.0 | 31.32 | 3.6 |
| Rougher Tail | 0.02 | 9.2 | 22.34 | 96.1 |
| Feed (Calculated) | 0.21 | 100.0 | 22.53 | 100.0 |

Reagents, lbs./ton: Rougher chlorine (as sodium hypochlorite) 3.6; activated carbon 1.6; burner oil 0.05; pine oil 0.07.
Cleaner: Chlorine 0.44; pine oil 0.02.

2. The following tests were made with a similar concentrate using sodium hypochlorite in one case and potassium dichromate and sulfuric acid in the other case in order to afford a comparison of the effect of these two oxidizing agents. It will be noted that the potassium dichromate was used with sulfuric acid to condition the feed, and this conditioned feed was then neutralized with soda ash.

*Comparison of sodium hypochlorite with potassium dichromate in molybdenite flotation*

| Reagent | Sodium Hypochlorite | Potassium Dichromate |
|---|---|---|
| Flotation Time | 5 minutes | 5 minutes |
| Feed: | | |
| $MoS_2$ % | 0.331 | 0.328 |
| Cu % | 25.54 | 23.47 |
| Concentrate: | | |
| $MoS_2$ % | 10.65 | 9.13 |
| Cu % | 35.47 | 47.74 |
| Tailing: | | |
| $MoS_2$ % | 0.022 | 0.024 |
| Cu % | 23.18 | 22.62 |
| Extraction: | | |
| $MoS_2$ % | 93.53 | 93.29 |
| Cu % | 4.37 | 6.82 |
| Ratio of Concentration | 34.5 | 29.9 |
| Reagents, Pounds/Ton: | | |
| Activated Carbon | 1.0 | 1.0 |
| Sodium Hypochlorite | 6.4 | |
| Pine Oil | 0.08 | |
| Sulfuric Acid | | 1.0 |
| Potassium Dichromate | | 1.25 |
| Soda Ash | | 4.0 |

The results indicated in Example 2 are from a single rougher flotation. Concentrates rich in molybdenite obtained in this simple economical manner may, of course, be subjected to further concentration, as may be expedient, by the same or different treatments.

Our invention has been found to be particularly effective in recovering molybdenite from concentrates obtained by using thiophosphates as the collector but may also be employed effectively for concentrates obtained through the use of xanthates or other organic collectors.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of recovering molybdenite from a flotation concentrate containing molybdenite and sulfides of other metals which comprises conditioning such concentrate in aqueous suspension by contact in unheated condition with a solution of a substance which under the conditions of treatment is an oxidizing agent for the collector in the concentrate, and subjecting the suspension of the concentrate thus conditioned to flotation for the recovery of molybdenite.

2. A process of recovering molybdenite from a flotation concentrate containing an organic collector, molybdenite and sulfides of other metals which comprises destroying at least some of said collector by treating the concentrate in aqueous suspension and in unheated condition with a solution of a substance which under the conditions of treatment is an oxidizing agent for the collector, and subjecting the treated concentrate to differential flotation to separate the molybdenite.

3. A process of recovering molybdenite from a flotation concentrate containing an excess of organic collector and frother, molybdenite and sulfides of other metals which comprises treating the concentrate in an aqueous suspension and while unheated with activated carbon and a solution of a substance which under the conditions of treatment is an oxidizing agent for the collector, and subjecting the treated concentrate to flotation to recover the molybdenite therefrom.

4. A process of recovering molybdenite from a flotation concentrate containing a small amount of molybdenite along with large amounts of copper and iron sulfides which comprises treating the concentrate in the form of a pulp and at normal temperatures with activated carbon and about 1 to 10 lbs. per ton of concentrate of a substance which under the conditions of treatment is an oxidizing agent for the collector, and subjecting the concentrate to a selective flotation to float the molybdenite and depress the copper and iron sulfides.

5. A process of recovering molybdenite from a flotation concentrate containing a small amount of molybdenite along with large amounts of copper and iron sulfides which comprises treating the concentrate in aqueous suspension under alkaline conditions with activated carbon and a hypochlorite, and subjecting the concentrate to selective flotation to recover the molybdenite.

6. A process of recovering molybdenite from a flotation concentrate containing a small amount of molybdenite along with large amounts of copper and iron sulfides which comprises treating the concentrate in aqueous suspension under acid conditions with activated carbon and a dichromate, and subjecting the concentrate to selective flotation to recover the molybdenite.

NATHANIEL ARBITER.
OREL E. YOUNG.

REFERENCES CITED

The following references are of record in the file of this patent:

UNITED STATES PATENTS

| Number | Name | Date |
|---|---|---|
| 2,011,177 | Keller | Aug. 13, 1935 |
| 2,070,076 | Brown | Feb. 9, 1937 |
| 2,095,967 | Brown | Oct. 19, 1937 |
| 2,195,724 | Gaudin | Apr. 2, 1940 |
| 2,255,776 | Janney | Sept. 16, 1941 |

FOREIGN PATENTS

| Number | Country | Date |
|---|---|---|
| 414,175 | Germany | May 23, 1925 |
| 566,024 | Germany | Dec. 11, 1932 |
| 476,435 | Great Britain | Dec. 8, 1937 |

OTHER REFERENCES

Mineral-Separation (Australia), 1647/26 (2 pp. spec.).

Mineral Industry for 1937, page 694.

Gaudin, "Flotation," copyright 1932, pages 165–168 and 210. (Copy in Div. 25.)